United States Patent [11] 3,607,372

| [72] | Inventor | John W. Gilliom |
| --- | --- | --- |
| | | Mansfield, Ohio |
| [21] | Appl. No. | 703,538 |
| [22] | Filed | Feb. 7, 1968 |
| [45] | Patented | Sept. 21, 1971 |
| [73] | Assignee | The Tappan Company |
| | | Mansfield, Ohio |

[54] SELF-CLEANING CATALYTIC COATING FOR OVEN SURFACES
1 Claim, No Drawings

[52] U.S. Cl. .................................................. 117/132 BS,
126/19, 252/430, 260/29.1
[51] Int. Cl. ........................................................ B32b 15/08
[50] Field of Search ............................................ 117/132
BS; 126/19; 260/29.1; 252/430

[56] References Cited
UNITED STATES PATENTS

| 3,002,947 | 10/1961 | Thomas | 117/132 |
| --- | --- | --- | --- |
| 3,078,006 | 2/1963 | Price | 117/132 |
| 3,271,322 | 9/1966 | Stiles | 252/428 |
| 3,300,542 | 1/1967 | Hadlock | 117/132 |
| 3,460,523 | 8/1969 | Stiles | 126/19 |
| 3,266,477 | 8/1966 | Stiles | 126/19 |
| 3,308,079 | 3/1967 | Haenni | 117/132 |

*Primary Examiner*—William D. Martin
*Assistant Examiner*—William R. Trenor
*Attorney*—Oberlin, Maky, Donnelly & Renner

ABSTRACT: A coating composition of a high-temperature release finish, such as silicone resin, and an oven catalyst, for cooking oven surfaces. The finish and catalyst are mixed, the composition applied to the surface, air dried, and then heat cured.

SELF-CLEANING CATALYTIC COATING FOR OVEN SURFACES

This invention relates to an improved coating of catalytic oxidizing type to be used for self-cleaning action on the interior surfaces of cooking ovens.

The self-cleaning ovens which are commercially available at this time require heating of the surfaces to a very high temperature, usually about 900° F., for consumption of the fool soils, and the catalytic coating approach has been proposed as a way to provide cleaning at lower or moderate temperatures, preferably within the normal range of operation of the oven. While experimentation with such coatings has been carried on for some time, and a comprehensive disclosure of the work done in this area by E. I. DuPont de Nemours & Company has been made available in its U.S. Pat. No. 3,266,477 here incorporated by reference. Sample compositions which I have applied to test oven liner sections according to certain known procedures have not proved satisfactory, particularly in respect of the expected cleanability and also the durability which obviously would be required in commercial use.

As set forth in the first-noted patent granted to DuPont, there are many catalysts known in the art which are effective for oxidizing food soils or residue at temperatures within the range of from about 350° F. to about 500° F. and thus capable of providing the desired self-cleaning action for the oven surfaces with usual oven design and operation. The patent describes in detail many different techniques for providing the oxidizing surface and a wide variety of possible carriers or vehicles to apply the catalyst to the surface to be coated. These need not be repeated here, but it may be noted that the preferred embodiment, illustrated in Fig. 4 of the patent, comprises a ceramic material on the metal liner surface which is resistant to temperature but softenable upon heating and a catalyst applied as a coating on the ceramic and partially embedded in the same by heating to the softening point of the ceramic.

However, it is my preference to apply the catalytic coating composition by spraying, since this is the technique most commonly used in conventional coating of oven liners, and in experimenting with prospectively suitable carriers, it has been discovered that superior coatings result when high-temperature release or nonstick finishes are employed.

More particularly, such a coating has been prepared and applied by mixing equal volumes of a DuPont oven oxidizing catalyst as disclosed in its aforesaid patents and Dow Corning 800 nonstick finish, the latter being a high-temperature silicone resin supplied by Engineering Products Division of Dow Corning Corporation, spraying the composition directly on a clean aluminized steel oven liner, air drying the coating, and then curing the same at a temperature of 350° F. for a period of 15 minutes.

The Dow corning finish is heat stable to a temperature of 800° F. and can be cured at a temperature within the range of from 275° to 600° F. for a period of 45 to 6 minutes. The other properties of this commercially available finish are described in the company's Bulletin: 07-265, dated Dec. 1967, and reference may also be had to its U.S. Pat. No. 3,308,079 for further disclosure such nonstick finishes or release coatings intended for use in cooking ovens and utensils.

The coating thus produced was relatively hard and abrasion resistant; food soils were applied to the coating and heat cleaning of the same carried out at a temperature of about 350° F. The self-cleaning action was considered very good, with little staining, which has proved to be a problem with certain other coatings.

The amount of the catalyst in the composition should be adequate to ensure an effective exposure of the same at the surface, and it was found that the coated surface in the above successful samples developed a matte finish with apparent granules, whereas the coating without any included catalyst was glossy. This finish was also produced with approximately 40 percent of the aforesaid catalyst by volume mixed with the silicone resin and was virtually the same with greater amounts of catalyst up to about 70 percent. Catalytic cleaning was accomplished with coatings within this range at temperatures of from about 300° to about 400° F., but residue staining was believed more evident at the higher catalyst values, and best results obtained with the catalyst proportion at from about 40 percent to about 50 percent by volume. Below this lower value, the finish of the coatings remained glossy and catalytic cleaning was not effected as desired.

Other tests were conducted with panels coated in the same manner, but with the silicone release coating SR-443 supplied by the Silicone Products Department of General Electric Company as the carrier, and approximately the same improved results were noted with this further coating.

The noted General Electric coating is described in its Product Data Publication SR-443 of Aug. 1967, and can be cured at 600° F. for 30 minutes in batch oven operation or in continuous operation, by heating to a temperature of 700° F. and holding such temperature for 10 to 15 minutes, after preheating at 500° F. for a few minutes and preferably with cooling to 600° F. before room air quenching.

It is significant that these coatings were realized with direct single-step application to the panel or liner, since other known procedures have indicated two coating steps and the preferred embodiment of the aforementioned DuPont patent is of course on this order as well. The new coating can be similarly directly applied to an enameled surface if desired.

The air drying preliminary to curing of the catalytic coating is also regarded as material, since some bubbling was experienced when curing was commenced with the wet coat.

The reasons why the new coatings proved to be superior are not fully understood. Release finishes are of course characterized by high heat stability, a very high order of chemical resistance, and an extremely low coefficient of friction which provides the antisticking property, all important in respect of mechanical cleaning generally, and it is believed that they support the particulate catalyst in an improved manner, with apparently more of the catalyst available at the surface for enhanced effectiveness in oxidizing the food residue.

Other modes of applying the principle of the invention may be employed, change being made as regards the details described, provided the features stated in any of the following claims or the equivalent of such be employed.

I, therefore, particularly point out and distinctly claim as my invention:

1. A cooking surface for ovens and the like having a catalytic coating thereon consisting of an oxidizing catalyst, effective for oxidizing food soils or residue at temperatures within the range of from about 300° F. to about 500° F., and a cured high-temperature silicone resin release coating composition as a carrier supporting said catalyst and applied therewith to said surface, said catalyst being exposed at said surface, the amount of said catalyst in said coating being in the range of 40 to 70 percent by volume.